A. DAMBACHER.
Improvement in Gates.

No. 129,538.

Patented July 16, 1872.

Witnesses.
E. G. Kastenhuber
A. Faber du Faur

Inventor.
August Dambacher
Van Santvoord & Hauff
Attys 129,538

UNITED STATES PATENT OFFICE.

AUGUST DAMBACHER, OF NEW YORK, N. Y.

IMPROVEMENT IN GATES.

Specification forming part of Letters Patent No. 129,538, dated July 16, 1872.

*To all whom it may concern:*

Be it known that I, AUGUST DAMBACHER, of the city, county, and State of New York, have invented a new and useful Improvement in Self-Closing Gates; and I do hereby declare the following to be a full, clear, and exact description thereof, which will enable those skilled in the art to make and use the same, reference being had to the accompanying drawing forming part of this specification, in which drawing—

Figure 1:
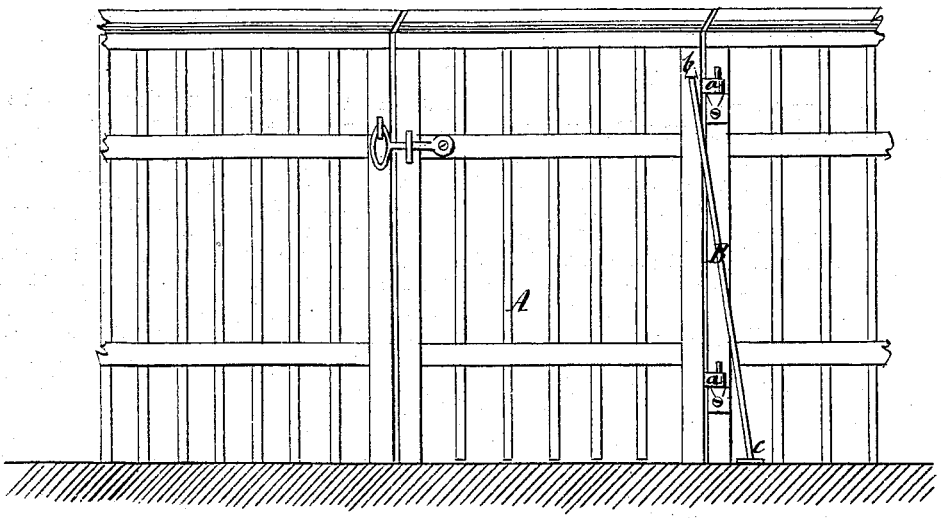
Figure 2:
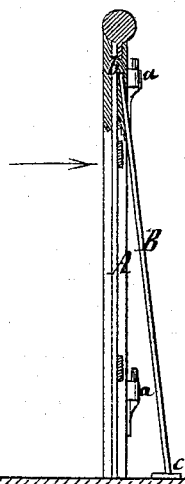

Figure 1 represents a front view of this invention. Fig. 2 is a transverse vertical section of the same.

Similar letters indicate corresponding parts.

This invention consists in a movable brace, bearing at its bottom end against a fixed support situated somewhat behind the hinges of the gate, and at its top end against a lug or bracket secured to the gate in close proximity to the rear edge thereof, in such a manner that when the gate is closed said brace occupies a position inclining toward the front edge of the gate, and if the gate is swung open said brace is carried from its inclined to an upright position, or nearly so, and by the action of the brace the gate is raised in its hinges, and as soon as the gate is released it closes by its own gravity, the movable brace being carried back to its inclined position.

In the drawing, the letter A designates a gate which is hung on hinges *a a*. On this gate, and near to its rear edge, is secured a bracket, *b*, which forms the bearing for the upper end of a brace, B. The lower end of this brace is stepped in a support, *c*, which may be fixed in the ground, or which may be rigidly secured to some part of the fence, and which is so situated in relation to the bracket *b* that when the gate is closed the brace is in a position inclining forward toward the front edge of the gate, as shown in Fig. 1 of the drawing.

When the gate is opened the brace is carried from its inclined toward an upright position, and as it approaches this upright position the gate is raised on its hinges. When the gate is released it naturally has a tendency to settle down on its hinges, and in settling down it is closed by the action of the brace, which returns to its inclined position. The brace may be made of iron or any other suitable material, and it can be applied with advantage to gates of every description; but its effect is best on gates made of iron or on such gates as have considerable weight, and which, when raised on their hinges, will settle down with considerable force.

By the action of my brace the gate closes automatically, while the brace is not in the way and can be applied to any gate with little trouble or expense.

What I claim as new, and desire to secure by Letters Patent, is—

The combination, with a gate, of a movable brace, B, bearing at one end against a bracket secured to the gate, and at its opposite end against a fixed support, substantially in the manner shown and described.

AUG. DAMBACHER.

Witnesses:
W. HAUFF,
E. F. KASTENHUBER.